United States Patent
Carroll

(10) Patent No.: US 11,903,376 B1
(45) Date of Patent: Feb. 20, 2024

(54) DUAL FUNCTION APPLICATOR SYSTEM AND MACHINE

(71) Applicant: Spring Run Services, LLC, Columbus Junction, IA (US)

(72) Inventor: Darwin Carroll, Columbus Junction, IA (US)

(73) Assignee: Spring Run Services, LLC, Columbus Junction, IA (US)

( * ) Notice: Subject to any disclaimer, the term of this patent is extended or adjusted under 35 U.S.C. 154(b) by 371 days.

(21) Appl. No.: 17/149,124

(22) Filed: Jan. 14, 2021

Related U.S. Application Data

(60) Provisional application No. 62/960,915, filed on Jan. 14, 2020.

(51) Int. Cl.
| | |
|---|---|
| *A01M 11/00* | (2006.01) |
| *B05B 13/00* | (2006.01) |
| *B05B 1/20* | (2006.01) |
| *B62D 65/02* | (2006.01) |
| *A01M 7/00* | (2006.01) |
| *A01C 15/04* | (2006.01) |

(Continued)

(52) U.S. Cl.
CPC ............. *A01M 11/00* (2013.01); *A01C 7/085* (2013.01); *A01C 15/005* (2013.01); *A01C 15/04* (2013.01); *A01M 7/0042* (2013.01); *A01M 7/0082* (2013.01); *B05B 1/20* (2013.01); *B05B 13/005* (2013.01); *B62D 65/02* (2013.01)

(58) Field of Classification Search
CPC .. A01M 11/00; A01M 7/0042; A01M 7/0082; A01C 7/085; A01C 15/005; A01C 15/04; B05B 1/20; B05B 13/005; B62D 65/02

USPC ....... 239/166, 168, 172, 289, 303–305, 654, 239/662, 663, 681
See application file for complete search history.

(56) References Cited

U.S. PATENT DOCUMENTS

| | | | | |
|---|---|---|---|---|
| 4,955,538 A | * | 9/1990 | Laube ................... | A01C 17/00 239/663 |
| 5,267,696 A | * | 12/1993 | Balmer ................. | A01C 15/00 239/662 |

(Continued)

OTHER PUBLICATIONS

Hagie Manufacturing Company, DTS10 Operator's Manual 19001-19500, Clarion, IA, 2018-19.

*Primary Examiner* — Steven J Ganey
(74) *Attorney, Agent, or Firm* — Hamilton IP Law, PC; Jay R. Hamilton

(57) ABSTRACT

An illustrative embodiment of a dual applicator machine having a dual applicator system may be configured through adding a dry product delivery system to an existing agricultural sprayer having a liquid product delivery system. The dual applicator machine may include a liquid product delivery system and a dry product delivery system that allow each separate system to perform either individually and independently or simultaneously. An illustrative embodiment of a dual applicator machine may be configured as a high-clearance agricultural sprayer having a frame, a cab, and a boom positioned in front of the cab. The dual applicator machine may be configured with liquid product tank(s) and powered by wheels attached to the frame via wheel mounting beams. The dual applicator machine may also include a dry product tank and a dry product meter system in fluid communication with both the dry product tank and a dry product delivery tube.

10 Claims, 24 Drawing Sheets

(51) Int. Cl.
*A01C 7/08* (2006.01)
*A01C 15/00* (2006.01)

(56) References Cited

U.S. PATENT DOCUMENTS

| | | | | |
|---|---|---|---|---|
| 5,485,962 A * | 1/1996 | Moss | ............. | A01C 15/04 |
| | | | | 239/662 |
| 5,533,676 A * | 7/1996 | Conley | ............. | A01D 43/14 |
| | | | | 239/289 |
| 6,336,600 B1 * | 1/2002 | Jessen | ............. | A01C 7/06 |
| | | | | 239/662 |
| 6,371,237 B1 | 4/2002 | Schaffer | | |
| 6,962,210 B1 | 11/2005 | Redenius | | |
| 7,717,353 B2 * | 5/2010 | Matulis | ............. | A01C 21/005 |
| | | | | 239/304 |
| 9,743,571 B2 | 8/2017 | Dames | | |
| 9,867,329 B2 * | 1/2018 | Wendte | ............. | A01C 15/14 |

* cited by examiner

DUAL FUNCTION APPLICATOR SYSTEM AND MACHINE

CROSS REFERENCE TO RELATED APPLICATIONS

This nonprovisional patent application claims priority from provisional U.S. Pat. App. No. 62/960,915 filed on Jan. 14, 2020.

FIELD OF INVENTION

This application relates to a method and apparatus allowing for delivery of dry crop amendments/product along with the spraying of liquid crop amendments/products via a mobile sprayer. As disclosed, an illustrative embodiment combines an agricultural sprayer with a liquid applicator and a separate dry system and applicator allowing each system to be operated either individually or simultaneously, as applicable and useful to application of crop amendments/products, without stopping the mobile sprayer to remove and/or exchange the two systems.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND AND DISCUSSION OF KNOWN ART

The benefits of applying dry products, such as fertilizer or cover crop seed, while simultaneously applying liquid products, such as herbicide or fungicide, in a single pass through the field are beneficial and include but are not limited to reduction in crop damage and soil compaction through multiple passes if each function was performed individually as well as the timeliness of the applications. The product packages offered to the customer are vast and applications are cost-effective as compared to traditional single-application methods.

Generally, dry product applicators (for delivering dry powder, pellets, etc.) are available in the prior art, as are liquid product applicators. However, due to technical hurdles, a high-clearance agricultural sprayer with dual functionality for liquid and dry applications was not available. The illustrative dual applicator system and dual applicator machine disclosed herein address various shortcomings and/or problems found in the prior art without limitation unless otherwise indicated in the following claims.

SUMMARY OF THE PRESENT DISCLOSURE

In one illustrative embodiment, the dual applicator machine and dual applicator system may be configured to combine an agricultural sprayer with a liquid applicator system and a separate dry applicator system, allowing each separate system to perform either individually and independently or simultaneously, if desired by the operator.

BRIEF DESCRIPTION OF THE FIGURES

In order that the advantages and/or features of the present disclosure will be readily understood, a more particular description of various illustrative embodiments will be rendered by reference to specific embodiments illustrated in the appended drawings. Understanding that these drawings depict only illustrative embodiments and are not therefore to be considered limiting of its scope unless otherwise indicated in the following claims, the illustrative embodiments will be described and explained with additional specificity and detail through the use of the accompanying drawings.

Figure 1:
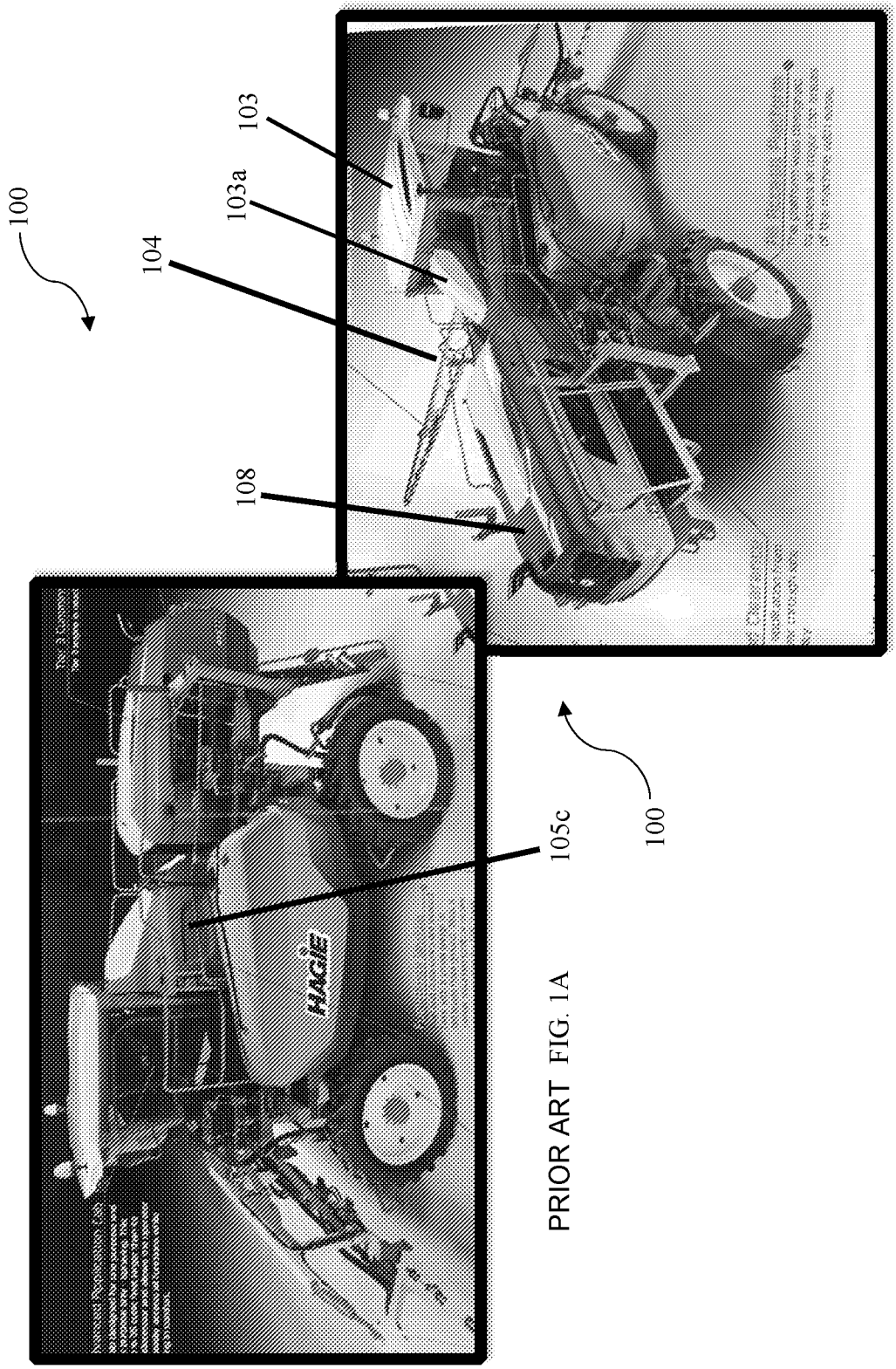
FIG. 1A provides an elevated side view of a prior art high-clearance agricultural sprayer with a liquid applicator as built by Hagie Manufacturing.
FIG. 1B provides an elevated rear perspective view of the prior art high-clearance agricultural sprayer of FIG. 1A.

| DETAILED DESCRIPTION-LISTING OF ELEMENTS | |
|---|---|
| ELEMENT DESCRIPTION | ELEMENT # |
| Dual applicator system | 10 |
| Dry product tank | 11 |

DETAILED DESCRIPTION-LISTING OF ELEMENTS

| ELEMENT DESCRIPTION | ELEMENT # |
| --- | --- |
| Dry tank lid | 11a |
| Dry product delivery tube | 12 |
| Dry product meter system | 12a |
| Blower | 13 |
| Blower inlet | 13a |
| Air plenum | 14 |
| Support bracket | 14a |
| Auxiliary hydraulic reservoir | 15 |
| Auxiliary hydraulic reservoir line | 15a |
| Auxiliary hydraulic oil cooler | 16 |
| Auxiliary oil cooler bracket | 16a |
| Auxiliary hydraulic pump | 17 |
| Fuel tank | 18 |
| Auxiliary radiator | 19 |
| Guide | 20 |
| Agricultural sprayer | 100 |
| Dual applicator machine | 100' |
| Frame | 102 |
| Cab | 103 |
| Storage compartment | 103a |
| Boom | 104 |
| Liquid product tank | 105a, 105b |
| Rinse tank | 105c |
| Wheel mounting beam | 106 |
| Front wheel | 107a |
| Rear wheel | 107b |
| Engine | 108 |
| Liquid product hose | 109 |

DETAILED DESCRIPTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments/aspects only and is not intended to be limiting. As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Aspect" when referring to a method, apparatus, and/or component thereof does not mean that limitation, functionality, component etc. referred to as an aspect is required, but rather that it is one part of a particular illustrative disclosure and not limiting to the scope of the method, apparatus, and/or component thereof unless so indicated in the following claims.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

It is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance. Additionally, various dimensions are disclosed herein and in the accompanying drawings, which dimensions are for illustrative purposes only and in no way limit the scope of the present disclosure unless otherwise indicated in the following claims.

Referring now to the drawings, wherein like reference numerals designate identical or corresponding parts throughout the several views, FIGS. 1A & 1B illustrate two different views of an agricultural sprayer 100 as known in the prior art. In an illustrative embodiment of the dual applicator system 10 disclosed herein, an agricultural sprayer 100 from the prior art may be modified such that it may provide the functionality of a dual applicator system 10 in a dual applicator machine 100'. In one illustrative embodiment, the agricultural sprayer 100 from the prior art may be configured as a high-clearance sprayer, and more particularly as a Hagie brand model DTS 10 high-clearance agricultural sprayer 100 that was originally configured by the manufacturer to deliver only liquid-based treatments. However, in other embodiments of the dual applicator system 10, dual applicator machine 100', and implementations thereof, the agricultural sprayer 100 may be differently configured without limitation unless otherwise indicated in the following claims.

Generally, an agricultural sprayer 100 may include a frame 102, a forwardly positioned cab 103, at least one boom 104, and a pair of liquid product tanks 105a, 105b positioned on either side of the frame 102. The liquid product tanks 105a, 105b may be configured to act as a reservoir for liquid amendments/products to be distributed to a crop and/or soil. An engine 108 may be positioned rearward of the liquid product tanks 105a, 105b.

At least one boom 104 may be secured to the frame 102 at a generally forward position. The boom 104, in combination with various other fluid handling components (e.g., liquid product hoses 109, tubes, pumps, valves, nozzles, etc., some of which are not shown for purposes of brevity) may be configured to supply liquid material to the ground and/or crop generally positioned below the boom 104 via one or more outlets (which outlets may be configured as nozzles, apertures, etc. without limitation unless otherwise indicated in the following claims). In one illustrative embodiment all or a portion of the fluid handling components may be integrated into the body and/or frame 104 of the agricultural sprayer 100 without limitation unless otherwise indicated in the following claims.

The rearwardly positioned engine 108 may be configured to provide an energy source for any/all systems of the agricultural sprayer 100 (e.g., electrical energy, kinetic energy, etc.). Accordingly, the engine 108 may provide the energy source to power both a pair of front wheels 107a and a pair of rear wheels 107b via a transmission (not shown). Additionally, both the front wheels 107a and rear wheels 107b may be engaged with respective wheel mounting beams 106 in a configuration that is shown and described in greater detail in U.S. Pat. Nos. 9,743,571; 6,962,210; and 6,371,237, which also provide various details regarding the frame 102, which may include a pair of side members interconnected by a front transverse member. A rear transverse member may be welded, or otherwise secured, to the side members. Typically secured to the front transverse member and the rear transverse member are four steering assemblies. As these types of agricultural sprayers 100 are well known in the prior art, it is unnecessary to recite further details related to their general design or operation. Applicant would note that the present disclosure allows for the production or modification of the general configuration of the illustrative agricultural sprayer 100 disclosed herein at FIGS. 1A and 1B for use with a dual applicator system 10 such that the prior art agricultural sprayer 100 may be converted to a dual applicator machine 100. However, other types of agricultural sprayers 100 may also be modified and/or configured for use as a dual applicator system 10 and/or converted to a dual applicator machine 100' without limitation unless otherwise indicated in the following claims.

Figure 2:
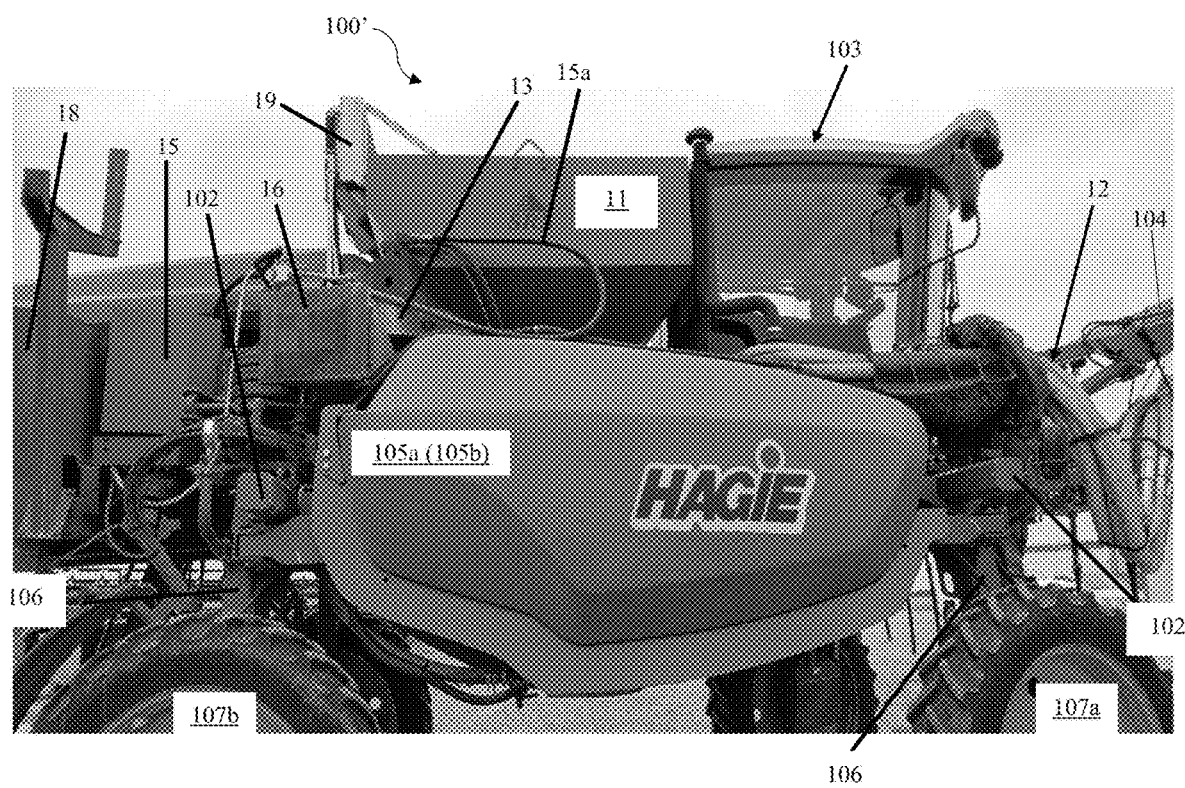
FIG. 2 is a side view of an illustrative embodiment of a dual applicator system configured as configured and mounted to a high clearance agricultural sprayer as found in FIGS. 1A and 1A to create an illustrative embodiment of a dual applicator machine.
Figure 7:
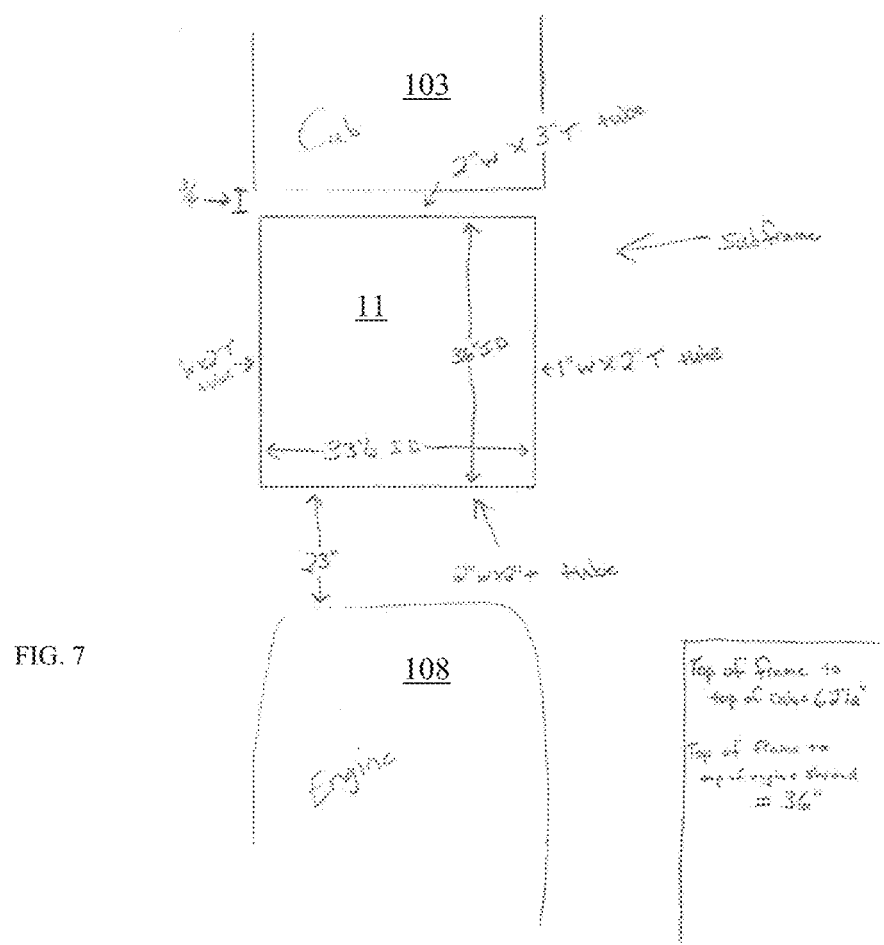
FIG. 7 is a detailed top view concept drawing with dimensions of the Dual Applicator System disclosed herein useful in enablement and fabrication of the invention disclosed.

A side view of a first illustrative embodiment of a dual applicator machine 100' is shown in FIG. 2, wherein the dual applicator system 10 shown therein has been configured and mounted to a high-clearance agricultural sprayer 100 (such as that shown in FIGS. 1A & 1B) to create a dual applicator machine 100'. In broad terms, the rinse tank 105c and storage compartment 103a from the agricultural sprayer 100 may be removed and a dry product tank 11 may be positioned in the space vacated by the removal of the rinse tank 105c and storage compartment 103a (i.e., the space between the cab 103 and engine 108) to facilitate one illustrative embodiment of a dual applicator machine 100'. Such a configuration is shown schematically in FIG. 7, which provides a top view of an illustrative embodiment of the positioning of various components of a dual applicator system 10 configured as a retrofit to an agricultural sprayer 100, wherein various dimensions of that illustrative embodiment of the dual applicator system 10 and/or dual applicator machine 100' are shown therein.

In the pictured illustrative embodiment, an existing agricultural sprayer 100 having a frame 102, cab 103, and boom 104, and configured with liquid product tank(s) 105a, 105b positioned on each side of the frame 102 has been converted to a dual applicator machine 100' having a dual applicator system 10 via installation of a dry product delivery system. The dry product delivery system may include a dry product tank 11, which may be positioned behind the cab 103 but in front of the engine 108 on the agricultural sprayer 100. The dry product tank 11 may include a dry tank lid 11a, and both the dry product tank 11 and dry tank lid 11a may be constructed of stainless steel. Generally, the dry tank lid 11a may be positioned on the top of the dry product tank 11 to provide relatively easy access to the interior of the dry product tank 11 (e.g., for loading of dry product, inspection, etc.). The dry product tank 11 and dry tank lid 11a may be configured such that the dry product tank 11 may be pressurized to facilitate delivery of dry product via the dry product delivery system as described in further detail below.

Figure 3:
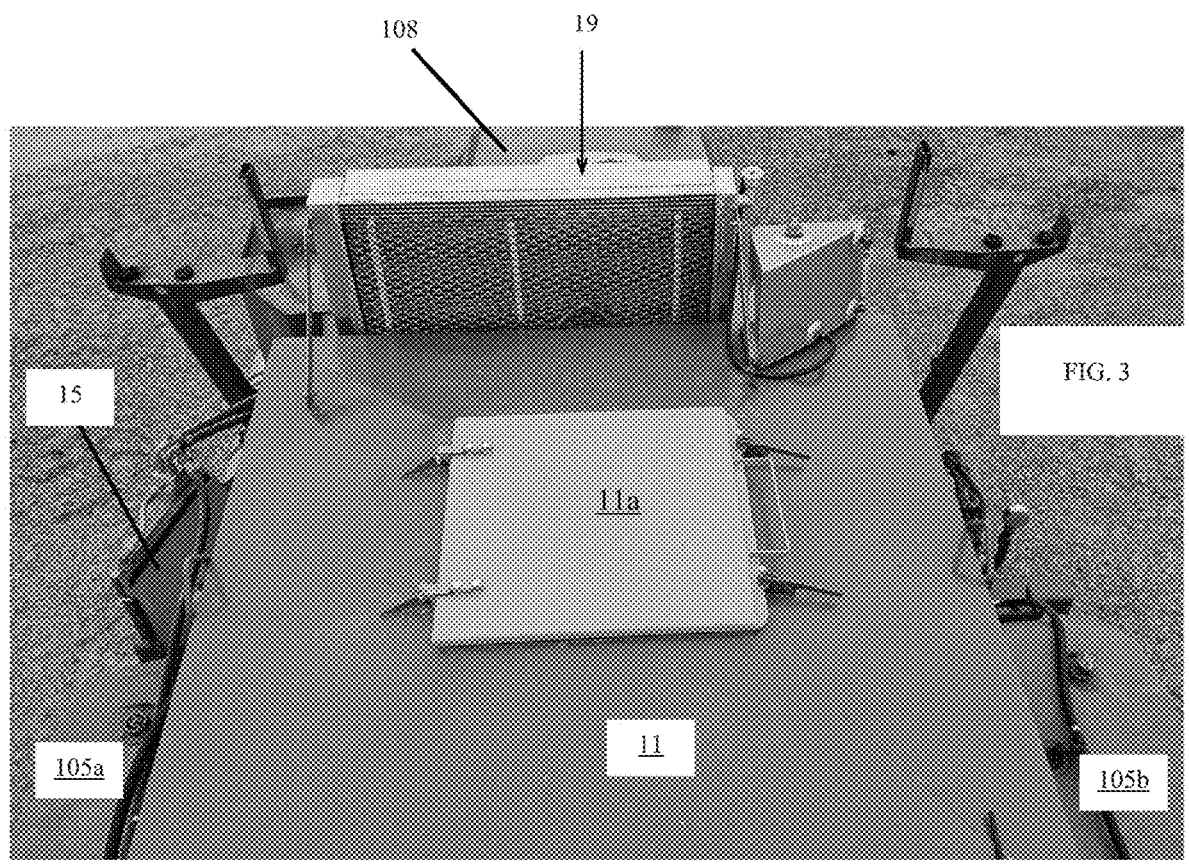
FIG. 3 is a top view of a portion adjacent the dry product tank of the illustrative embodiment of a dual applicator machine shown in FIG. 2.

The dry product tank 11 may be connected to dry product delivery tubes 12 via a dry product meter system 12a, which dry product meter system 12a may be positioned adjacent to where the dry product exits the dry product tank 11, which for the illustrative embodiment is at the bottom of the dry product tank 11 (described in further detail below). The dry product delivery tubes 12 may lead from the dry product meter system 12a to the boom 104 and eventually to one or more outlets (which may be configured as tubes, apertures, etc. depending at least on the specific characteristics of the dry product without limitation unless otherwise indicated in the following claims) located below and/or adjacent to a lower portion of the boom 104. A top view of a portion of an illustrative embodiment of the dual applicator system 10 (retrofit to an existing agricultural sprayer 100 such as that shown in FIGS. 1A & 1B to form a dual applicator machine 100') is shown in FIG. 3. The relative positions of the dry product tank 11, dry tank lid 11a, liquid tanks 105a, 105b, auxiliary radiator 19, cab 103, and auxiliary hydraulic reservoir 15 are shown at least FIG. 3.

Figure 5A:
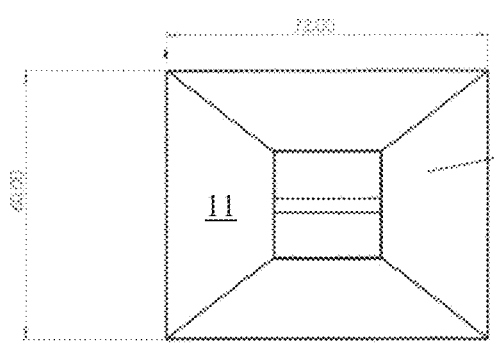
FIGS. 5A-5C provide top, front, and side views, respectively, of an illustrative embodiment of a dry product tank with various dimensions shown therein.
Figure 5B:
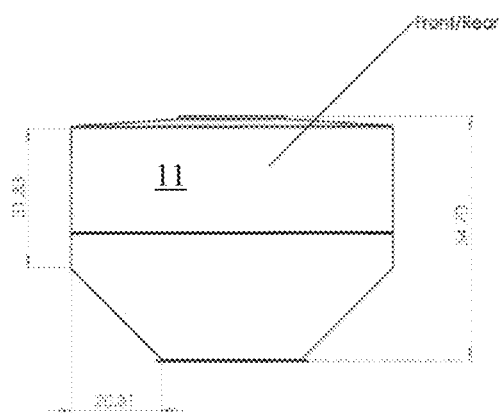
Figure 5C:
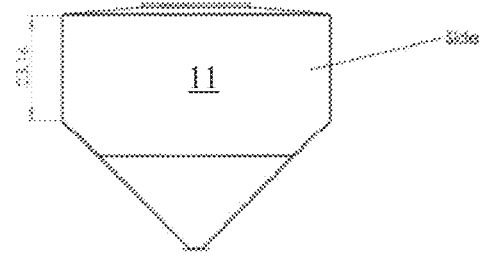
Figure 6:
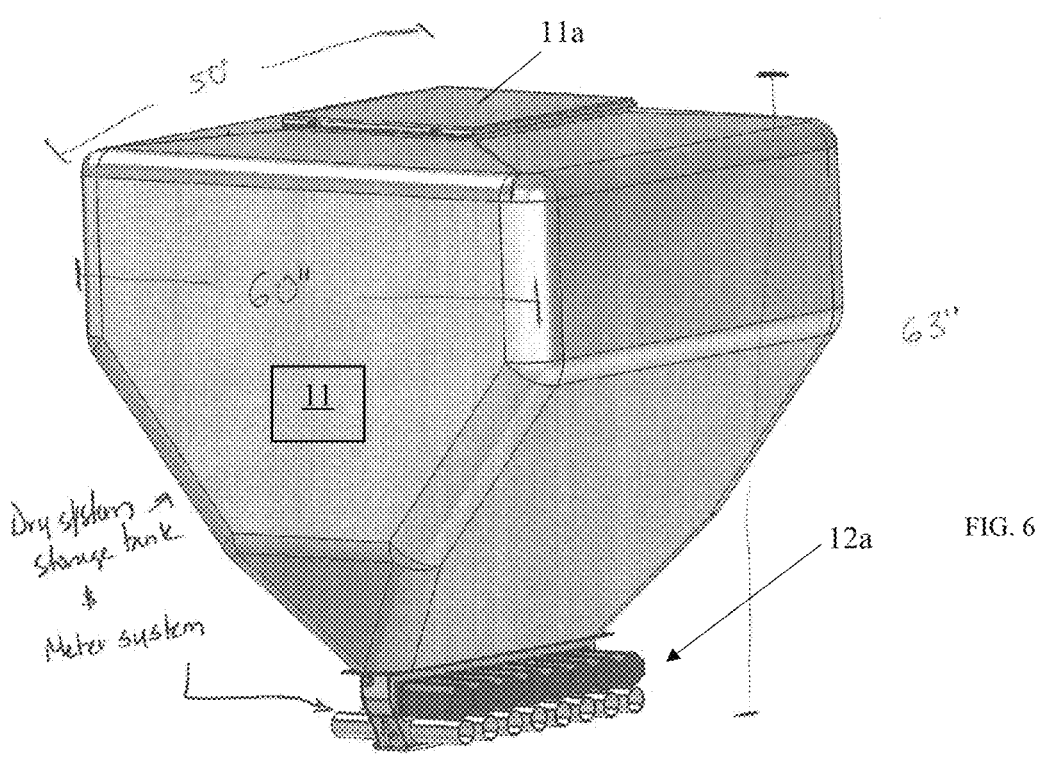
FIG. 6 is a perspective view of the illustrative embodiment of the dry product tank with an illustrative embodiment of a dry product delivery meter system engaged therewith.

Various drawings of an illustrative embodiment of a dry product tank 11 that may be used with certain embodiments of the dual applicator system 10 are shown in FIGS. 5A-5C, wherein various dimensions of that illustrative embodiment of the dry product tank 11 are shown therein. However, as previously stated, any dimensions provided herein or in the accompanying drawings are not meant to be limiting and are for illustrative purposes only unless otherwise indicated in the following claims. A perspective view of the embodiment of the dry product tank 11 shown in FIGS. 5A-5C is provided in FIG. 6, wherein a dry product meter system 12a is engaged with the dry product tank 11 at a bottom portion thereof. The configuration and location of the dry product tank 11 in the illustrative embodiment of a dual applicator system 10 (i.e., positioned just behind the cab 103 and having angled lower portions to direct material in the dry product tank 11 toward the dry product meter system 12a via gravity in the manner of a conventional hopper) and in front of the engine 108 with a dry tank lid 11a positioned at the top of the dry product tank 11 to allow for loading and inspection has been selected to allow for operation and use of both wet and dry product delivery systems on the frame 102 of the agricultural sprayer 100 without removal of either system during non-use. In the illustrative embodiment of a dual applicator system 10, all components of the dry product and liquid product delivery systems may be selected and configured to fit within the available space of the existing frame 102 with minimal modification without limitation unless otherwise indicated in the following claims.

Figure 4:
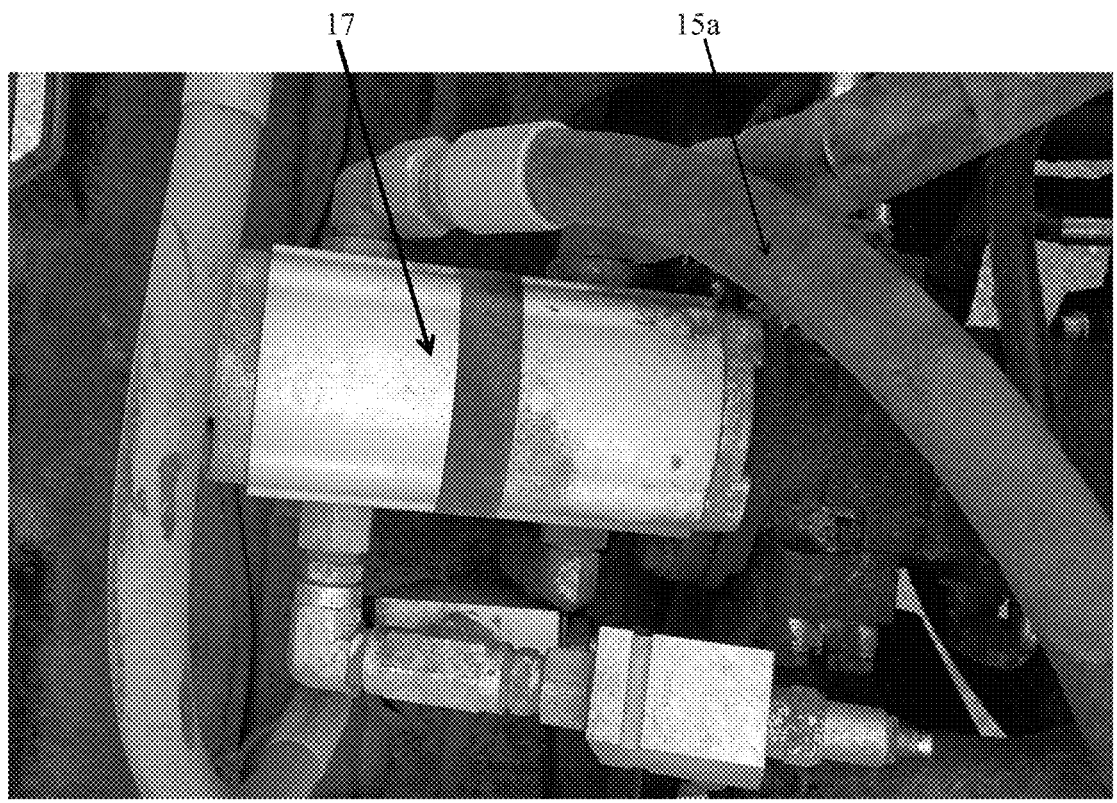
FIG. 4 is a detailed view of a hydraulic pump of the illustrative embodiment of a dual applicator machine shown in FIGS. 2 & 3.

Referring now to FIG. 4, shown therein is a portion enlarged hydraulic fluid system used with at least one illustrative embodiment of dual applicator system 10. During testing and development, applicant found that the dual applicator system 10 may require additional hydraulic pumping capacity and additional engine cooling capacity for a dual applicator machine 100' compared to an agricultural sprayer 100. As shown in various figures (and particularly FIGS. 3 & 4), one illustrative embodiment of a dual applicator system 10 may include an auxiliary hydraulic reservoir 15. An auxiliary hydraulic reservoir line 15a may be positioned adjacent an upper portion of the dual applicator machine 100' and adjacent the dry product tank 11. An auxiliary hydraulic oil cooler 16, auxiliary hydraulic pump 17, and auxiliary radiator 19 may be positioned in the upper portion of the dual applicator machine 100', as shown, but may be positioned in other places and/or differently configured without limitation unless otherwise indicated in the following claims. It is contemplated that the auxiliary radiator 19 may provide additional cooling capacity to the engine 108, whereas the auxiliary hydraulic oil cooler 16 may provide additional cooling capacity to the hydraulic system. In another embodiment, rather than adding an auxiliary radiator 19 to provide increased cooling capacity to the engine, the existing radiator on the agricultural sprayer 100 may be replaced with a higher-capacity radiator. Accordingly, the specific configuration of auxiliary radiator 19 (e.g., position, size, associated components such as tubing, pipes, valves, etc.) and whether it is required for any specific embodiment of a dual applicator system 10 and/or dual applicator machine 100' in no way limits the scope of the present disclosure unless otherwise indicated in the following claims.

In an illustrative embodiment, the auxiliary hydraulic reservoir 15 on the dual applicator machine 100' may have a capacity that is between 20% and 100% greater than the hydraulic system capacity on the agricultural sprayer 100. Furthermore, the auxiliary hydraulic pump 17 on the dual applicator machine 100' may have a volumetric flow-rate capacity that is between 20% and 100% greater than the flow rate capacity of the existing hydraulic system pump on the agricultural sprayer 100. In some illustrative embodiments of the dual applicator machine 100' the auxiliary hydraulic pump 17 may replace the existing hydraulic pump from the agricultural sprayer 100, and in other illustrative embodiments the auxiliary hydraulic pump 17 may supplement the existing hydraulic pump. Furthermore, in some illustrative embodiments of the dual applicator machine 100' the auxiliary hydraulic reservoir 15 may replace the existing hydraulic reservoir from the agricultural sprayer 100, and in other illustrative embodiments the auxiliary hydraulic reservoir 15 may supplement the existing hydraulic reservoir. Accordingly, the specific configuration of the auxiliary hydraulic system (e.g., auxiliary hydraulic reservoir 15 configuration, position, size, etc.; auxiliary hydraulic pump 17 configuration, position, size, etc.; auxiliary hydraulic oil cooler configuration, position, size, etc.) in no way limits the scope of the present disclosure unless otherwise indicated in the following claims.

In an illustrative embodiment of the dual applicator machine 100' pictured herein, the auxiliary hydraulic oil cooler 16 may be positioned adjacent a blower inlet 13a of a blower 13 configured to provide pressurized air to the dry product delivery system. Such a configuration may allow for a more efficient use of air flow over the auxiliary hydraulic oil cooler 16, thereby eliminating the need for a separate fan for the auxiliary hydraulic oil cooler 16. However, other positions and/or configurations of the blower 13, blower inlet 13a, and/or auxiliary hydraulic oil cooler 16 may be used without limitation unless otherwise indicated in the following claims. The auxiliary hydraulic oil cooler 16 may be engaged with an auxiliary oil cooler bracket 16a as shown at least in FIG. 10E. The auxiliary oil cooler bracket 16a may secure a portion of the auxiliary hydraulic oil cooler 16 to a rigid, load-bearing portion of the dual applicator machine 100', which may provide additional support, stabilization, and/or longevity to the auxiliary hydraulic oil cooler 16 and/or associated components. The optimal configuration, position, etc., of the various components of the enlarged hydraulic fluid system (e.g., auxiliary hydraulic reservoir 15, auxiliary hydraulic reservoir line 15a, auxiliary hydraulic oil cooler 16, auxiliary hydraulic pump 17, auxiliary radiator 19, etc.) may vary from one embodiment of the dual applicator system 10 and/or agricultural sprayer 100 to the next, and is therefore in no way limiting to the scope of the present disclosure unless otherwise indicated in the following claims.

Figure 8A:
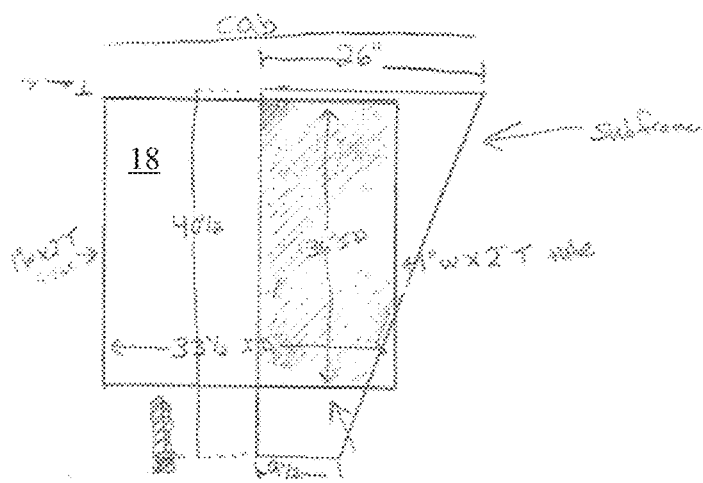
FIGS. 8A & 8B are side views of an illustrative embodiment of a fuel tank that may be used with various embodiments of a dual applicator machine.
Figure 8B:
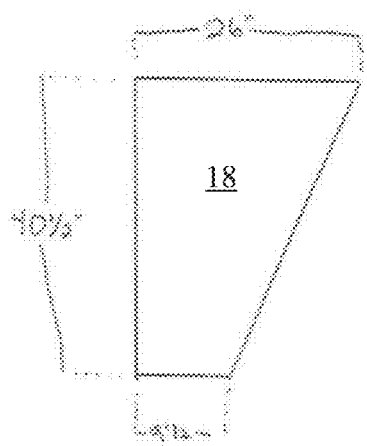
Figure 9:
FIG. 9 is a perspective front view of an illustrative embodiment of a dual applicator machine.

Referring no to FIGS. 8A & 8B, an illustrative embodiment of the dual applicator system 10 may provide a fuel tank 18 that is differently configured and differently located than that of the existing agricultural sprayer 100 as found in the prior art. Generally, the fuel tank 18 as shown in FIGS. 8A & 8B may be configured with a greater volume than those found in the prior art (and repositioned to allow for fitment of various components of the dry product delivery system) to allow for additional operational capacity for the operator compared to the operational capacity of prior art agricultural sprayers 100 while simultaneously fitting within the available space of an agricultural sprayer configured as a dual applicator system 10. However, the specific configuration of the fuel tank 18 (e.g., position, shape, capacity, etc.) in no way limits the scope of the present disclosure unless otherwise indicated in the following claims.

Generally, a dual applicator machine 100' may be configured as such from a manufacturer, that is, a manufacturer may offer a dual applicator machine 100' that is configured from the factory to allow for dry product and/or liquid product application simultaneously and/or selectively. Alternatively, and as described in detail herein, a prior art agricultural sprayer 100 may be retrofit with the required components such that it is a dual applicator system 10 is engaged with the agricultural sprayer 100 such that it is converted to a dual applicator machine 100' that is configured to allow for dry product and/or liquid product application simultaneously and/or selectively. Accordingly, the scope of the present disclosure is not limited to when the required components that allow for dry product and/or liquid product application simultaneously and/or selectively are installed, the method of manufacture (e.g., OEM or retrofit), etc. unless otherwise indicated in the following claims.

The preceding illustrative embodiments provide the structure that may be used for providing the dry and liquid product delivery systems as configured for use with a modern high-clearance agriculture sprayer 100 that has been configured from the factory to deliver only liquid product. In the illustrative embodiment pictured herein, each product delivery system (liquid and dry) may operate independently, as each may be configured with storage and delivery mechanisms as well as computer programs to control the timing, rate, placement and/or other characteristics of their respective products. In the illustrative embodiment, the liquid product delivery system may feature two liquid product tanks 105a, 105b each having a volume of 500 gallons, one placed on each side of the frame 102. However, other embodiments of a dual applicator system 10 may have differently configured and/or sized liquid product tanks 105a, 105b without limitation unless otherwise indicated in the following claims. Furthermore, in an illustrative embodiment, the metering system for the liquid product and that for the dry product may be separate from one another, but both product delivery systems may use a common GPS source without limitation unless otherwise indicated in the following claims.

Additionally, for an illustrative embodiment of a dual applicator system 10 pictured herein, an agricultural sprayer 100 was modified by relocating the fuel tanks 18 and respective fuel lines and/or various fuel handling components to the rear of the frame 102 and by adding a 4,400 pound-capacity stainless steel, air-pressurized dry product tank 11 directly behind the cab 103 as previously described above. Further, the rinse tank 105c and storage compartment 103a from the agricultural sprayer 100 as found in the prior art may be removed when converting a prior art agricultural sprayer 100 to a dual applicator machine 100' without limitation unless otherwise indicated in the following claims.

Figure 12A:
FIGS. 12A & 12B are perspective views of an illustrative embodiment of a header that may be used with various illustrative embodiments of a dual applicator machine.
Figure 12B:
Figure 13A:
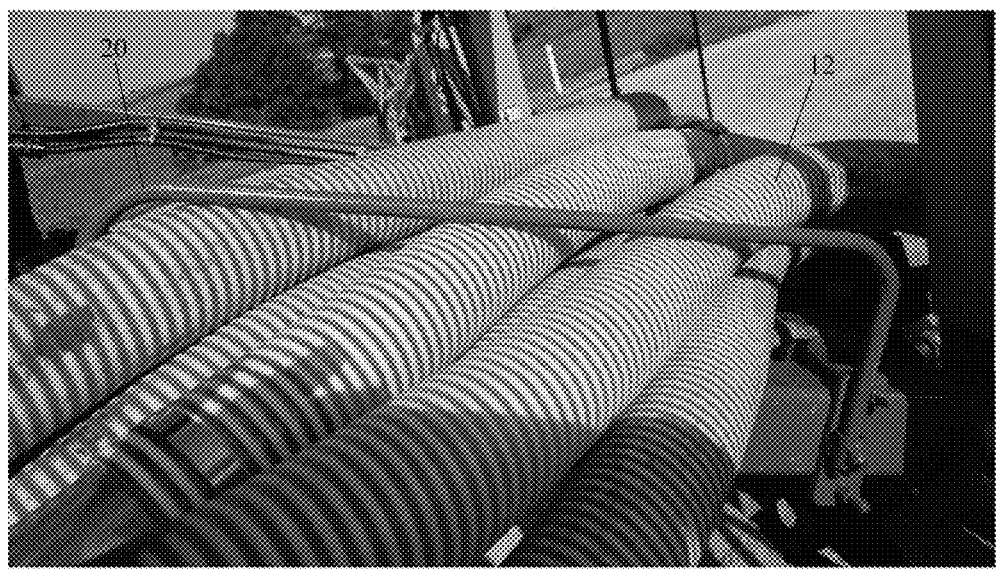
FIGS. 13A-13D provide various views of guides that may be engaged with one or more dry product delivery tubes.
Figure 13B:
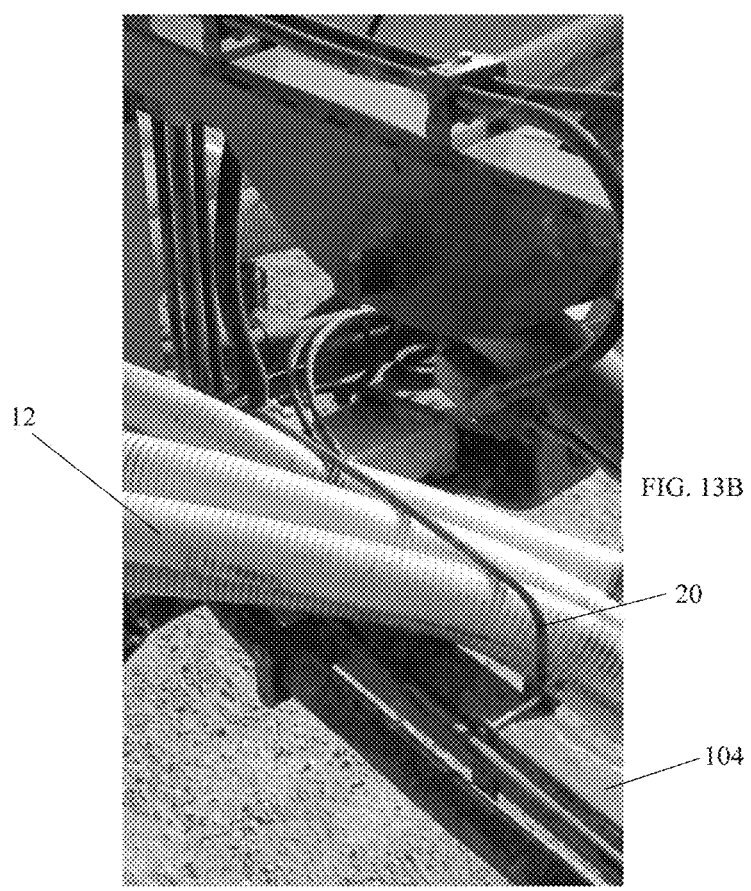
Figure 13C:
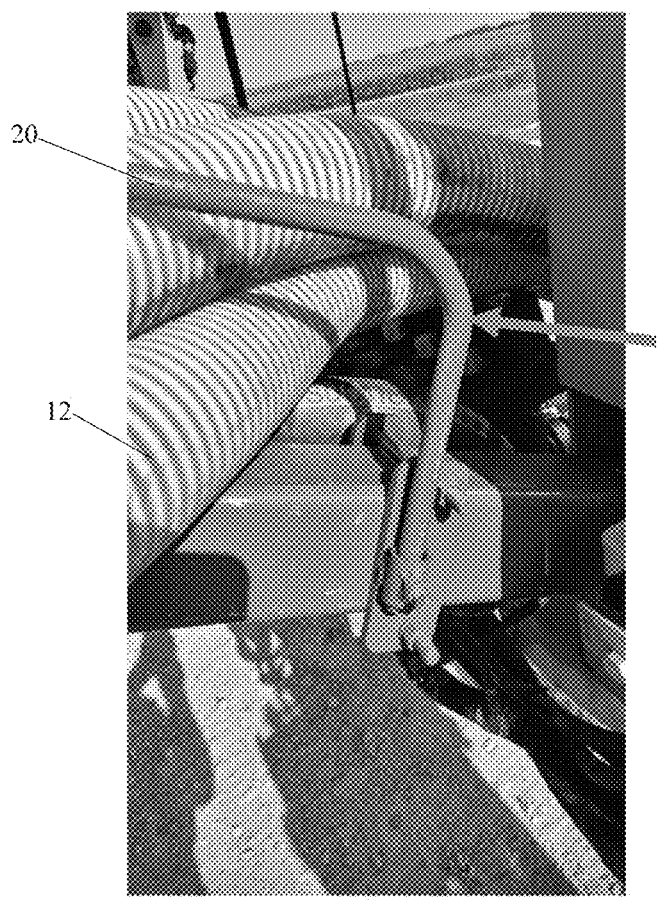
Figure 13D:
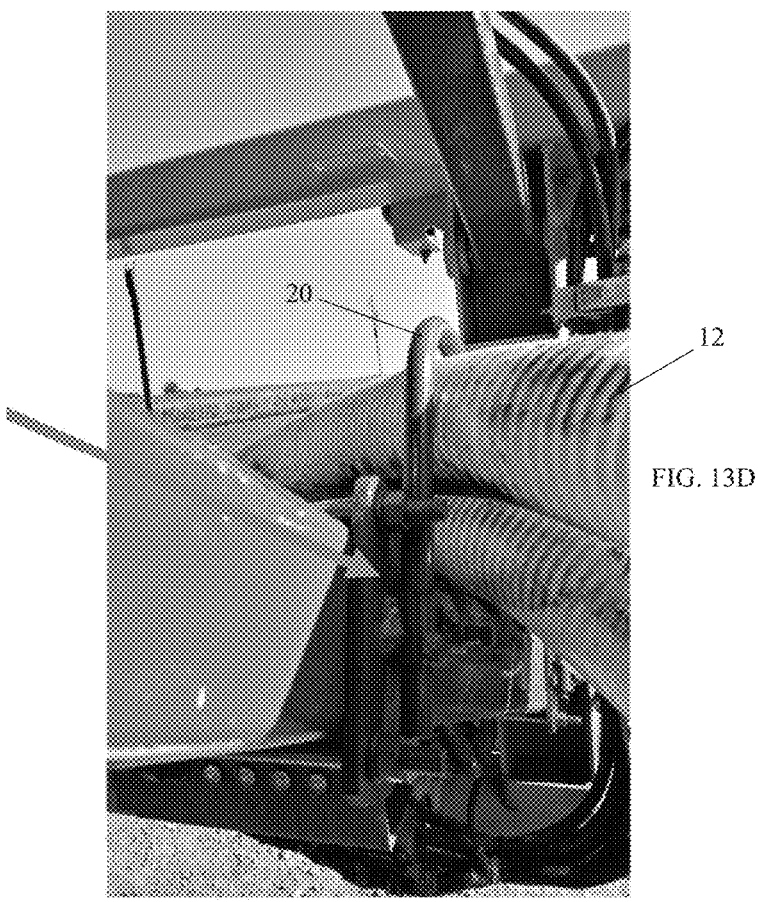

Referring to FIGS. 12A & 12B, in an illustrative embodiment, the dry product delivery system may be configured with a dry product meter system 12a that employs a sixty-five cubic foot (65 cu. ft.), six (6) outlet electronic dry product meter system 12a that feeds dry product through a central portion of the dual applicator machine 100' below the dry product tank 11 through dry product delivery tubes 12 that may be configured to span the width of the ninety-foot (90 foot) boom 104 at the front of the dual applicator machine 100' so as to deliver consistent flow of dry product throughout the length of the boom 104. Other illustrative embodiments of a dual applicator machine 100' may utilize an eight (8) outlet electronic dry product meter system 12a without limitation unless otherwise indicated in the following claims.

Generally, the dry product may be delivered via pressurized fluid (e.g., air) within the dry product delivery system, and to ensure proper dry product delivery at all points along the length of the boom 104, the boom 104 may be equipped with air-distribution towers, air-hoses, and mounts as well as drop tubes to deliver dry product immediately adjacent the ground surface (e.g., under the crop canopy for certain applications).

Figure 10A:
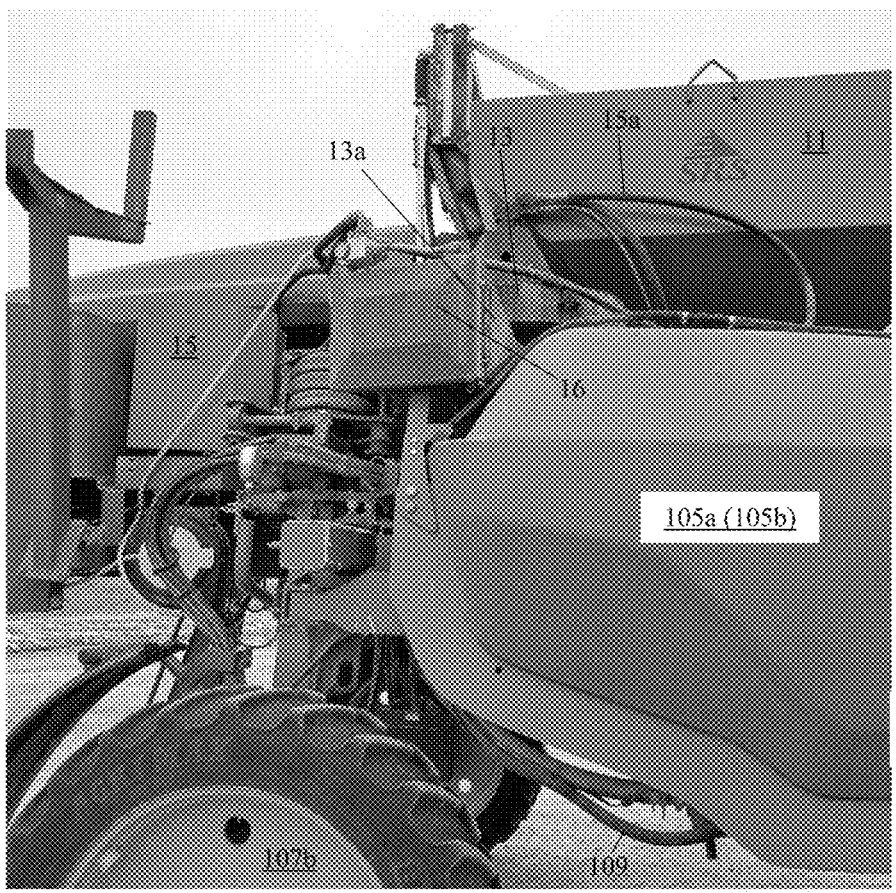
FIGS. 10A-10D are various side views adjacent the rearward portion of the illustrative embodiment of a dual applicator machine shown in FIG. 9.
Figure 10B:
Figure 10C:
Figure 10D:
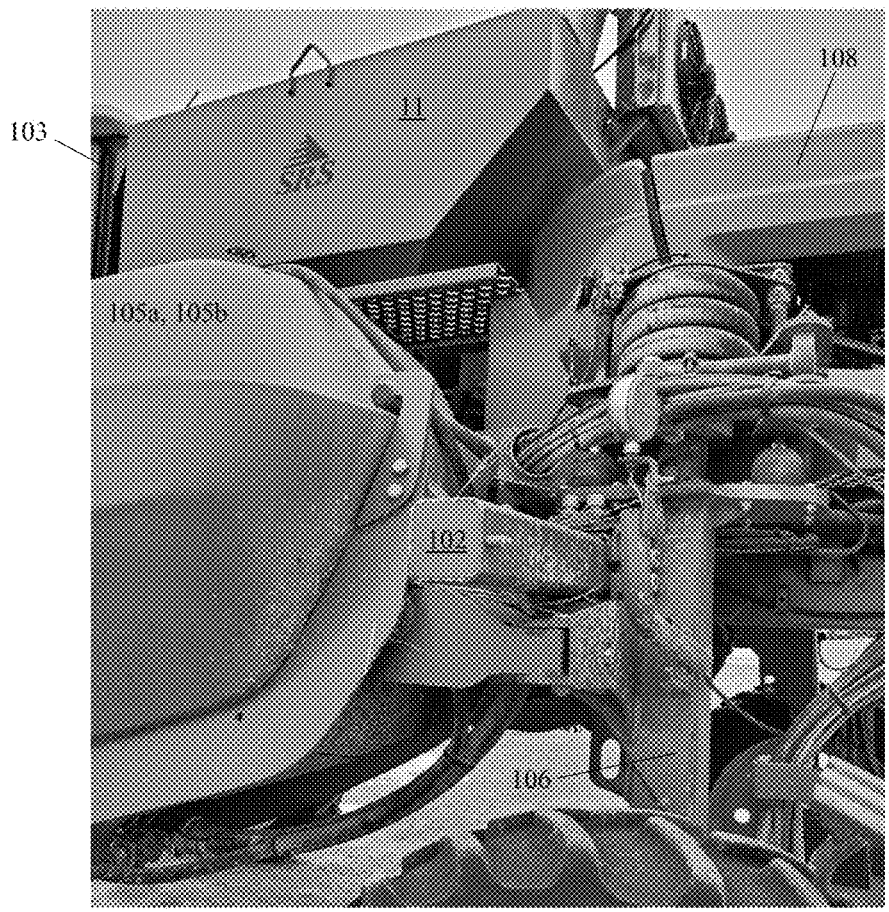
Figure 10E:
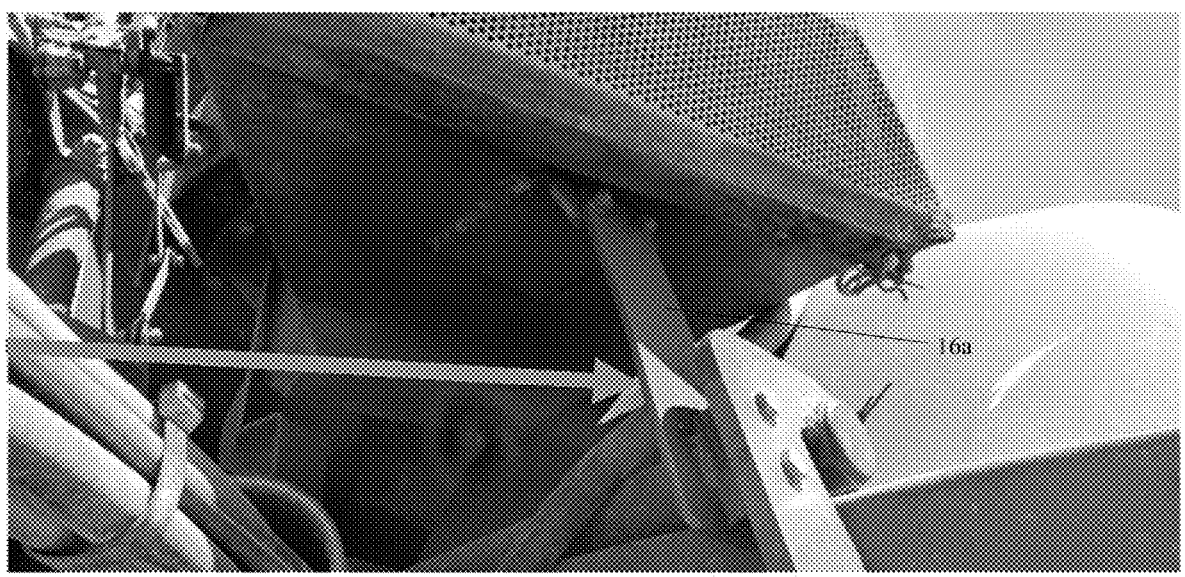
FIG. 10E is a detailed view of an auxiliary oil cooler bracket positioned.
Figure 11A:
FIGS. 11A & 11B are views of an illustrative embodiment of a plenum.
Figure 11B:
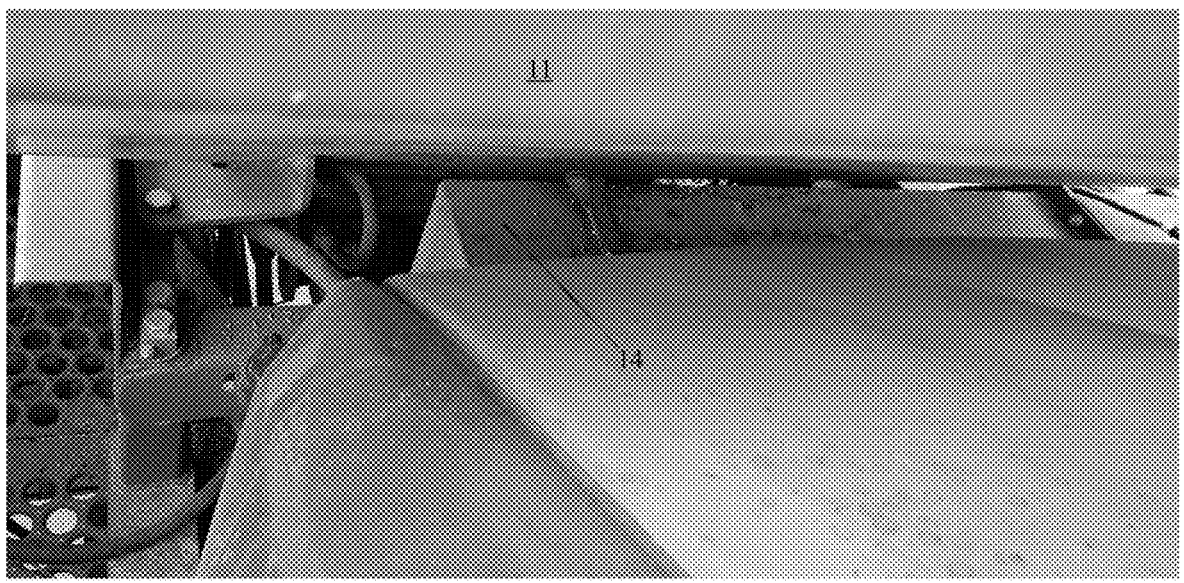
Figure 11C:
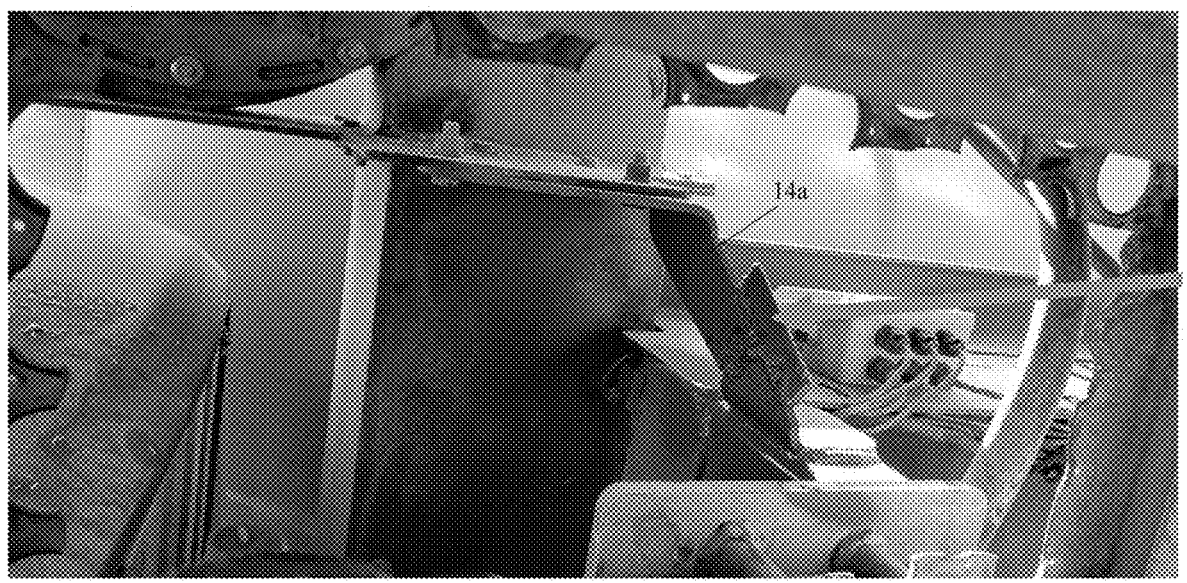
FIG. 11C is a detailed view of a support bracket.

Referring now to FIGS. 10A & 11A, a blower 13 may be in fluid communication with the dry product meter system 12a and provide pressurized air to an air plenum 14 that is in fluid communication with the dry product meter system 12a. A support bracket 14a may be engaged with a portion of the air plenum 14. The support bracket 14a may secure a portion of the air plenum 14 to a rigid, load-bearing portion of the dual applicator machine 100', which may provide additional support, stabilization, and/or longevity to the air plenum and/or associated components. Additional fluid and/or air handling components (e.g., valves, compressors, control systems and/or components, tubes, fluid conduits, etc.) may be used with the dry product delivery system without limitation unless otherwise indicated in the following claims. Additionally, in other embodiments of the dual applicator system 10 and/or dual applicator machine 100', the dry product delivery system may be differently config-ured (e.g., differently positioned and/or configured dry product tank 11, differently positioned and/or configured boom 104, etc.) without limitation unless otherwise indicated in the following claims. In the illustrative embodiment pictured herein, the dual applicator machine 100' may be configured such that the dry product is applied to the crop and/or ground surface slightly ahead of the liquid product. However, in other illustrative embodiments the liquid product may be applied to the crop and/or ground surface slightly ahead of the dry product without limitation unless otherwise indicated in the following claims. It is contemplated that the optimal positioning of the dry product and/or liquid product exit points along the boom 104 may vary from one application to the next and may be at least in part dependent on the configuration of the boom 104 and folding mechanism thereof to ensure proper functioning without damaging the dry product delivery tubes 12 and/or liquid product hoses 109.

Referring now to FIGS. 13A-13D, one or more guides 20 may be positioned at various positions adjacent to one or more dry product delivery tubes 12. The guides 20 may be engaged with a portion of the boom 104 and/or a different component of the dual applicator machine 100' and may serve to prevent the dry product delivery tubes 12 from becoming positioned in an undesirable location. It is contemplated that the guides 20 may prevent the dry product delivery tubes engaged therewith from being bent, otherwise damaged, and/or subjected to unwanted wear (e.g., abrasion) during use of the dual applicator machine 100', and particularly during folding, unfolding, or other movement of the boom 104 without limitation unless otherwise indicated in the following claims. Additionally, one or more pads (not shown) may be strategically positioned to prevent unwanted contact between a portion of a dry product delivery tube 12 and another component of the dual applicator system 100', which contact may cause premature failure and/or damage to the dry product delivery tube 12 without limitation unless otherwise indicated in the following claims.

As discussed above, during development, it was found that additional engine cooling capacity for the agricultural sprayer 100 may be required to accommodate the increased functionality of a dual applicator system 10, and such modifications may be required for various embodiments of the dual applicator system 10 and/or dual applicator machine 100' without limitation unless otherwise indicated in the following claims. Additionally, and also discussed above, to convert an existing agricultural sprayer 100 to a dual applicator machine 100' having a dual applicator system 10, an enlarged hydraulic fluid system may be required. In one illustrative embodiment the hydraulic fluid system may be increased to operate at a rate of 40 gallons per minute, and an auxiliary hydraulic oil cooler 16 and auxiliary hydraulic reservoir 15 may also added. However, other embodiments of the dual applicator system 10 and/or dual applicator machine 100' may have differently configured hydraulic fluid systems (e.g., different capacities, different flow rates, differently positioned and/or configured coolers, etc.) without limitation unless otherwise indicated in the following claims.

The capacity of the dry product delivery system was configured such that for many applications of the dual applicator system 10 and/or dual applicator machine 100', both the dry product delivery system and liquid product delivery system would require refilling at approximately the same time based on the capacity of the liquid product delivery system as originally configured on the agricultural sprayer 100. In an illustrative embodiment, the liquid capacity of the liquid product tanks 105a, 105b may be 500 gallons each, for a total of 1000 gallons. The dry product tank 11 may have a capacity of 4400 pounds (which may result in a capacity of approximately 65 to 75 bushels) such that a liquid product application rate of 15 gallons per acre and a dry product application rate of one bushel per acre will cause simultaneous or nearly simultaneous depletion of the liquid product in the liquid product tanks 105a, 105b and of the dry product in the dry product tank 11. It is contemplated that simultaneously depleting and subsequently refilling both the dry product delivery system and liquid product delivery system may increase efficiency and limit damage to the crops through fewer field entries and exits. However, the scope of the dual applicator system 10 is not so limited unless otherwise indicated in the following claims.

A dual applicator machine 100' may be configured to enter a field of crop at any stage of crop maturity and/or with no crop. Further, both the dry and liquid product delivery systems may be configured with computer implemented instructions such that they are GPS activated without limitation unless otherwise indicated in the following claims. Generally, such computer implemented instructions may be configured to recognize areas where product (either dry or liquid) has been applied and may automatically turn off the required product delivery mechanisms and/or components to these areas, which in turn may reduce overages and increase delivery accuracy without limitation unless otherwise indicated in the following claims. It should also be understood that while the above and other advantages and results of the present disclosure will become apparent to those skilled in the art from the following detailed description and accompanying drawings, showing the contemplated novel construction, combinations, and elements as herein described, and more particularly defined by the appended claims, it should be clearly understood that changes in the precise embodiments of the herein disclosed apparatuses and method are meant to be included within the scope of the claims, except insofar as they may be precluded by the prior art.

The materials used to construct the apparatuses and/or components thereof may vary depending on the specific application thereof, but it is contemplated that polymers, synthetic materials, metals, metal alloys, natural materials, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various processes and apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the apparatuses and methods and/or embodiments thereof as pictured and described herein are for illustrative purposes only, and the scope of the present disclosure extends to all processes, apparatuses, and/or structures for providing the various benefits and/or features of the present disclosure unless so indicated in the following claims, such as all similar apparatuses for allowing modification or improvement of an agricultural sprayer 100 including using the various elements disclosed herein as part of the dual applicator system 10 and/or to make a dual applicator machine 100' as suitable for the application.

While various apparatuses and methods according to the present disclosure have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the processes and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the apparatuses and methods disclosed herein are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps, process parameters, etc. of the apparatuses and methods disclosed herein may be used alone or in combination with one another depending on the compatibility of the features, components, functionalities, advantages, aspects, configurations, process steps, process parameters, etc. Accordingly, a nearly infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

What is claimed is:

1. A dual applicator machine comprising:
    a. a frame;
    b. a cab engaged with said frame;
    c. an engine engaged with said frame;
    d. a pair of front wheels engaged with said frame;

e. a pair of rear wheels engaged with said frame;
f. a boom engaged with said frame, wherein said boom is further defined as being positioned in front of said cab;
g. a liquid product delivery system configured to provide and dispense a liquid product from a first position on said boom, wherein said liquid product delivery system is further defined as comprising:
  i. a first liquid product tank engaged with said frame;
  ii. a second liquid product tank engaged with said frame;
h. a dry product delivery system configured to provide and dispense a dry product from a second position on said boom, wherein said dry product delivery system is further defined as comprising:
  i. a dry product tank engaged with said frame, wherein said dry product tank is further defined as being positioned between said cab and said engine;
  ii. a dry product meter system engaged with said dry product tank; and,
  iii. a blower, wherein said blower is configured to provide kinetic energy to said dry product;
  iv. an air plenum fluidly connected to said dry product meter system and said blower;
  v. a dry product delivery tube positioned along the length of said boom, wherein said dry product delivery tube is in fluid communication with said dry product meter system;
i. a guide, wherein said guide is engaged with said boom and said dry product delivery tube, wherein a portion of said dry product delivery tube passes through a space between said boom and said guide; and
j. wherein said dry product delivery system and said liquid product delivery system are configured to be operated simultaneously or independently.

2. The dual applicator machine according to claim 1 further comprising:
a. an auxiliary hydraulic reservoir, and,
b. an auxiliary hydraulic pump, wherein said auxiliary hydraulic pump provides an energy source for said blower.

3. The dual applicator machine according to claim 2 further comprising an auxiliary hydraulic oil cooler.

4. A method of converting an agricultural sprayer to a dual applicator machine, said method comprising the steps of:
a. selecting said agricultural sprayer, said agricultural sprayer comprising:
  i. a frame;
  ii. a cab engaged with said frame;
  iii. an engine engaged with said frame;
  iv. a pair of front wheels engaged with said frame;
  v. a pair of rear wheels engaged with said frame;
  vi. a boom engaged with said frame;
  vii. a fuel tank in fluid communication with said engine;
  viii. a hydraulic system having a volumetric capacity;
  ix. a rinse tank positioned between said cab and said engine;
  x. a storage compartment positioned between said cab and said engine; and,
  xi. a liquid product delivery system configured to provide and dispense a liquid product from a position on said boom, wherein said liquid product delivery system provides a liquid product below said boom from an outlet;
b. removing said rinse tank from said agricultural sprayer;
c. removing said storage compartment from said agricultural sprayer;
d. positioning a dry product tank on a frame of said agricultural sprayer in a position vacated by said rinse tank and said storage compartment, wherein a dry product meter system is in fluid communication with said dry product tank;
e. repositioning said fuel tank to a rearward position on said dual applicator machine;
f. increasing said volumetric capacity of said hydraulic system;
g. providing a blower in fluid communication with said dry product meter system; and,
h. providing a dry product delivery tube along a portion of said boom, wherein said dry product delivery tube is in fluid communication with said dry product meter system.

5. The method according to claim 4 wherein said dry product delivery tube includes an outlet, and wherein said outlet of said dry product delivery tube is positioned behind said outlet of said liquid product delivery system.

6. The method according to claim 5 further comprising the step of providing an auxiliary hydraulic oil cooler.

7. The method according to claim 6 further comprising the step of providing an auxiliary hydraulic reservoir.

8. The method according to claim 7 further comprising the step of positioning an air plenum between said blower and said dry product meter system, wherein said air plenum is in fluid communication with said blower and said dry product meter system.

9. The method according to claim 8 further comprising the step of positioning an inlet to said blower adjacent said auxiliary hydraulic oil cooler.

10. The method according to claim 9 further comprising the step of sizing said dry product tank and a capacity of said liquid product delivery system such that an application rate of said liquid product of 15 gallons per acre and an application rate of said dry product of 1 bushel per acre depletes said dry product tank and said liquid product delivery system at approximately the same time.

* * * * *